United States Patent [19]

Hayashi

[11] Patent Number: 5,417,513
[45] Date of Patent: May 23, 1995

[54] LEVER OF LEVER TYPE CONNECTOR

[75] Inventor: Hiroyuki Hayashi, Yokkaichi, Japan

[73] Assignee: Sumitomo Wiring Systems, Ltd., Yokkaichi, Japan

[21] Appl. No.: 99,561

[22] Filed: Jul. 30, 1993

[30] Foreign Application Priority Data

Sep. 3, 1992 [JP] Japan .................. 4-062117 U

[51] Int. Cl.⁶ .................................. H01R 13/00
[52] U.S. Cl. .................. 403/321; 403/381; 403/322; 439/160; 439/310; 439/372
[58] Field of Search ............. 403/321, 322, 33, 381; 439/153, 157, 152, 160, 310, 372, 340; 16/126; 156/73.1, 73.2, 580.1, 580.2; 411/339; 24/581, 582, 585, 631, 636, 638, 647

[56] References Cited

U.S. PATENT DOCUMENTS

| 1,188,568 | 6/1916 | Smith | 439/157 |
|---|---|---|---|
| 3,059,206 | 10/1962 | Williams | 439/157 |
| 3,367,809 | 2/1968 | Soloff | 156/73.1 |
| 4,393,540 | 7/1983 | Yumamoto | 16/126 |
| 4,658,467 | 4/1987 | Stolarz | 16/126 |
| 5,135,410 | 8/1992 | Kawase et al. | |

FOREIGN PATENT DOCUMENTS

| 2055120 | 3/1987 | Japan | 156/73.1 |
|---|---|---|---|
| 926768 | 5/1963 | United Kingdom . | |
| 2179506 | 3/1987 | United Kingdom . | |
| 2260659 | 4/1993 | United Kingdom | 439/372 |

OTHER PUBLICATIONS

United Kingdom Search Report dated Nov. 22, 1993.

Primary Examiner—Dave W. Arola
Assistant Examiner—Anthony Knight
Attorney, Agent, or Firm—Sandler Greenblum & Bernstein

[57] ABSTRACT

A lever type connector includes a lever, and a first connector and a second connector to be connected to each other. Two pins formed on the first connector are inserted through the through-opening formed on each of two separate components of the lever. Then, the two components are connected to each other by, for example, an automatic ultrasonic welding device, so that it is unnecessary to expand one of the components of the lever in installing the components on the first connector in contrast to the conventional method. The components of the lever can be installed on the first connector with no deformation or breakage occurring in the components because no great force is applied.

9 Claims, 8 Drawing Sheets

LEVER OF LEVER TYPE CONNECTOR

BACKGROUND OF THE INVENTION

1. Field of the Invention

The present invention relates to a lever of a lever type connector comprising a pair of component connectors, and more particularly to the lever to be used as a means for allowing the component connectors of the lever type connector to be connected to each other easily.

2. Description of the Related Arts

A great force is required to connect a plurality of connectors, for example, 20 or more to each other. Therefore, lever type connectors have been proposed to connect them easily by means of a lever which allows an operator to connect them by applying a relatively small force thereto.

An example of a lever of the lever type connector of this kind is described below with reference to FIGS. 8 through 10. A lever 2 comprises side walls 2a and 2b and a connecting portion 2c continuous with the side walls 2a and 2b, thus having a U-shaped configuration. Each of a pair of pins 3d and 3e projecting from each of side walls 3a and 3b of a female connector 3 is rotatably inserted through a through-opening 2d formed on a right side wall 2a of the lever 2 and a through-opening 2e formed on a left side wall 2b of the lever 2.

A circular arc guide groove 2f is formed on the inner surface of the right side wall 2a of the lever 2 and a circular arc guide groove 2g is formed on the left side wall 2b thereof. When a male connector 4 is inserted into a hole 3c of the female connector 3 with the lever 2 installed thereon, each of a pair of guide pins 4c and 4d projecting from side walls 4a and 4b of the male connector 4 engage each of the guide grooves 2f and 2g of the lever 2. Due to the rotation of the lever 2, the male connector 4 is moved into the female connector 3 through the hole 3c. In this manner, the male connector 4 and the female connector 3 are connected to each other.

The lever 2 is installed on the female connector 3 as follows: As shown in FIG. 10, the pin 3d projecting from the side wall 3a of the female connector 3 is inserted through the through-opening 2d formed on the side wall 2a of the lever 2 and then, the pin 3e projecting from the side wall 3b of the female connector 3 is inserted through the through-opening 2e formed on the left side wall 2b of the lever 2 by pressing the left side wall 2b in X-direction to expand the lever 2 in the left side thereof.

As described above, the operator presses the left side wall 2b of the lever 2 with the right side wall 2a thereof supported by the pin 3d of the female connector 3. Therefore, when the left side wall 2b is pressed strongly in the X-direction, there is a possibility that the distance between the side walls 2a and 2b of the lever 2 in the lower portion thereof becomes greater than that between the side walls 2a and 2b of the lever 2 in the upper portion of the lever 2 and the lever thus deformed is not restored to the original configuration. In addition, if the operator applies an excessive amount of force to the lever 2, the lever may be broken.

When the lever has been plastically deformed, needless to say, the lever cannot be rotated smoothly. In this situation, the operator has various troubles in installing the lever 2 on the female connector 3. For example, the operator's hand aches.

SUMMARY OF THE INVENTION

It is an object of the present invention to provide a lever, to be used as a means for connecting component connectors of a lever type connector to each other, which can be installed on a component connector automatically without the lever being plastically deformed or broken.

In accomplishing these and other objects of the present invention, in a lever type connector comprising a first connector and a second connector to be connected to each other, in which each of a pair of supporting pins projecting from both side walls of the first connector is rotatably inserted through a through-opening formed on each of separate components of a lever; and each of a pair of guide pins projecting from the second connector engages a guide groove formed on each of the separate components of the lever. The lever comprising the components joined with each other is rotated to move the second connector into the first connector to connect the first and second connectors to each other or move the second connector away from the first connector to disconnect the first and second connectors from each other by means of the engagement between the guide pins projecting from the second connector and the guide grooves formed on the components of the lever. The components of the lever are joined with each other by a joining means to shape the lever into a U-shaped configuration, with each of the pins of the first connector inserted through the through-opening formed on each of the components of the lever.

The U-shaped lever comprises a plurality of separate components, for example, first and second separate components. The first component comprises a side wall and a connecting portion, thus having an L-shaped configuration. The second component comprises a side wall. The first and second components are connected to each other by means of a joining means formed at a joining surface of the first and second components.

The lever may comprise two components symmetrical with respect to the center of the connecting portion or three components, namely, two side walls and the connecting portion provided that each side wall of the lever has a through-opening through which each of a pair of the supporting pins of the female connector is inserted.

The components of the lever are joined with each other as follows: A pin is projectingly formed in the joining surface of one of the components and a through-opening is formed in the joining surface of the other component so that the pin is inserted through the through-opening. The leading end of the pin which has projected from the through-opening is exposed to ultrasonic wave to melt resin composing the pin and weld the melted resin to the outer surface of the other component.

The components of the lever may be connected to each other as follows: A metal plate composing one of the components of the lever is formed by insert molding. The metal plate having a locking groove is formed in the joining surface of one of the components. A metal plate having a locking projection formed in the joining surface of the other component is prepared. The locking projection is inserted into the locking groove to connect both components to each other.

A screw may be tightened into a threaded opening formed in the joining surface of each component to connect both components to each other. Any other constructions of the lever may be adopted to connect the components to each other so long as automatic connecting devices can be used.

According to the above-described construction, the two pins formed on the female connector are inserted through the through-opening formed on each of the two separate components of the lever. Thereafter, the two components are connected to each other by an automatic ultrasonic welding device. Accordingly, it is unnecessary to expand one of the components of the lever in installing the components on the female connector unlike the conventional method. That is, the components can be installed on the female connector with no deformation or breakage occurring in the components because no great force is applied thereto.

Further, since there is no need for expanding the side wall of lever in connecting the components of the lever to each other, the components can be automatically installed on the female connector with ease. Therefore, the lever according to the present invention allows the connector to be assembled at a low cost and has various advantages.

BRIEF DESCRIPTION OF THE DRAWINGS

These and other objects and features of the present invention will become clear from the following description taken in conjunction with the preferred embodiments thereof with reference to the accompanying drawings, in which:

FIG. 9; and

DETAILED DESCRIPTION OF THE INVENTION

Figure 1:
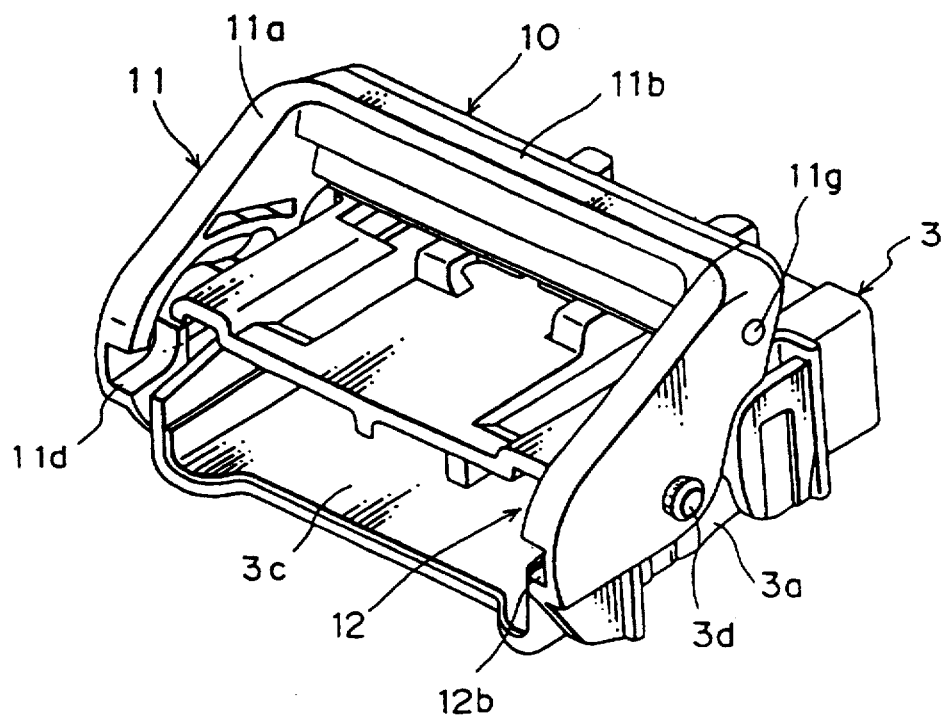
FIG. 1 is a perspective view showing a lever type connector to which a lever has been connected according to a first embodiment of the present invention.

Before the description of the present invention proceeds, it is to be noted that like parts are designated by like reference numerals throughout the accompanying drawings.

The construction of a male connector 4 and that of a female connector 3 are identical to that of the conventional male and female connector described previously, the constructions thereof are not described herein.

A lever of a lever type connector according to the first embodiment is described below with reference to FIGS. 1 through 3. In the lever type connector, two components of a lever 10 are installed separately on a female connector 3. The two components are joined with each other by ultrasonic welding to form a U-shaped lever 10. The lever 10 is made of hard or semi-hard thermoplastic resin.

Referring to FIGS. 1 through 3 and 8 through 10, the female connector 3 on which the lever 10 is installed is a multipolar connector having a plurality of terminal-accommodating chambers (not shown) arranged in parallel with each other. Supporting pins 3d and 3e (not shown in FIG. 1 but shown in FIG. 10) project from side walls 3a and 3b of the female connector 3, respectively. The male connector 4 is inserted into an open portion 3c of the female connector 3 so that the male connector 4 engages the female connector 3 or removed therefrom so that the male connector 4 disengages therefrom.

Figure 2:
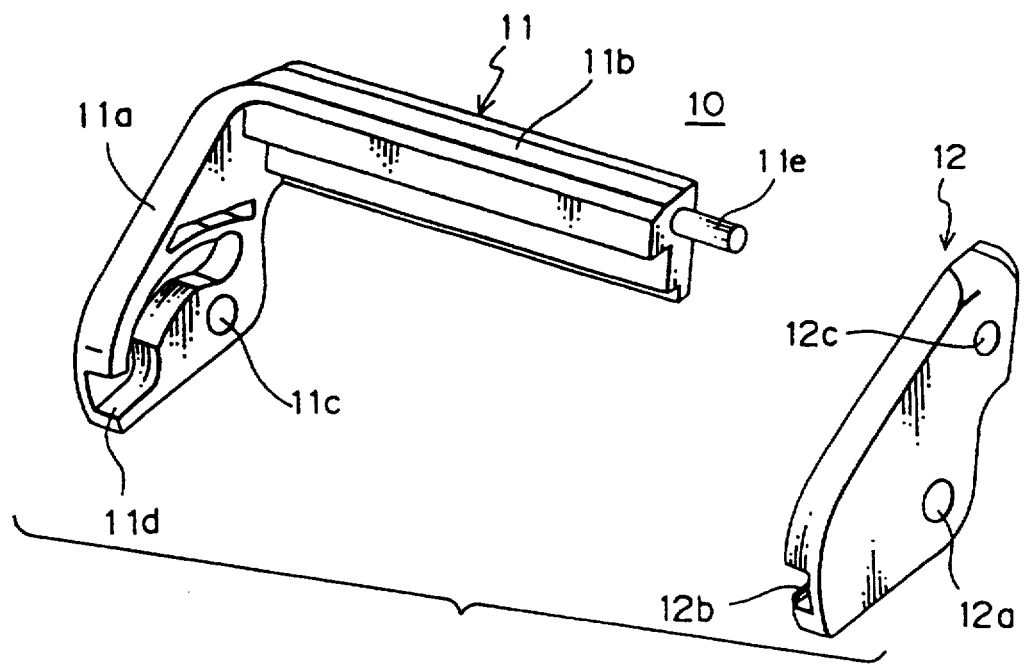
FIG. 2 is an exploded perspective view showing the lever according to the first embodiment.

As shown in FIG. 2, the lever 10 comprises a first component 11 and a second component 12. The first component 11 comprises a side wall 11a and a connecting portion 11b, thus having an L-shaped configuration. The second component 12 comprises a side wall.

Through-openings 11c and 12a are formed on the side wall of each of the first and second components 11 and 12, and guide grooves 11d and 12b are formed on the inner surface of the side wall of each of the first and second components 11 and 12.

A pin 11e projects from the end surface of the connecting portion 11b of the first component 11. A through-opening 12c through which the pin 11e is to be inserted is formed on the second component 12 which is to be joined with the end surface of the connecting portion 11b as shown in FIG. 3.

In installing the lever 10 on the female connector 3, first, the pin 3e projecting from the side wall 3b of the female connector 3 is inserted through the through-opening 11c formed on the side wall 11a of the first component 11. Then, the pin 3d projecting from the side wall 3a of the female connector 3 is inserted through the through-opening 12a of the second component 12 and at the same time, the pin 11e projecting from the connecting portion 11b of the first component 11 is inserted through the through-opening 12c of the second component 12.

Figure 3:
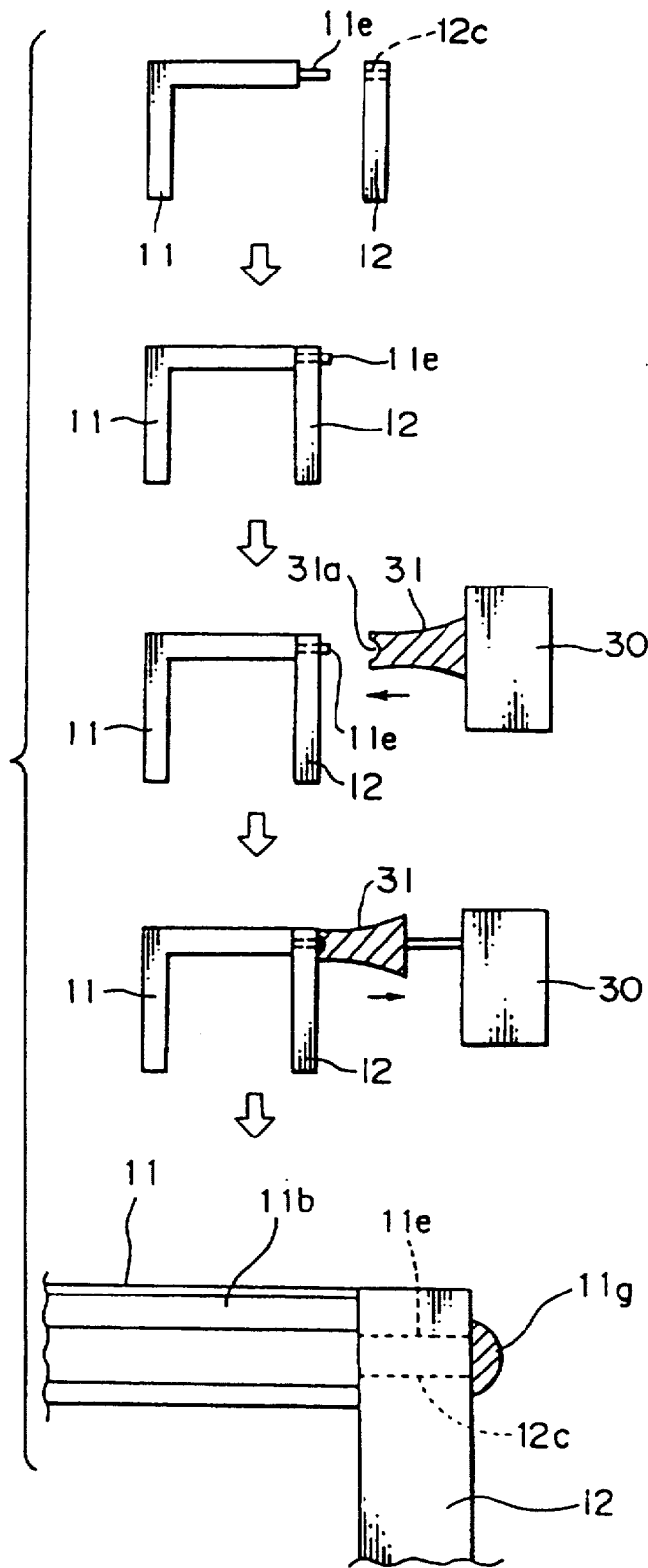
FIG. 3 is a view showing the process of connecting components to each other to form the lever according to the first embodiment.

The pin 11e which has been inserted through the through-opening 12c and projected therefrom is exposed to ultrasonic wave to form a locking head 11g at the leading end of the pin 11e as shown in FIG. 3.

The formation of the locking head 11g allows the first and second components 11 and 12 to be automatically joined with each other. Further, the lever 10 thus installed on the female connector 3 cannot be removed therefrom as shown in FIG. 1.

According to the ultrasonic welding, a converter converts electrical energy into mechanical vibrations (frequency: 20–40 kc/s); the generated vibrations are transmitted to a jig; the jig is brought into contact with thermoplastic resin. As a result, heat is generated locally in the joining surface between the outer surface of the second component and the leading end of the pin 11e by vibration friction. Consequently, the thermoplastic resin is melted and welded to the joining surface.

That is, as shown in FIG. 3, the pin 11e is inserted through the through-opening 12c. Then, the leading end 31a of a jig 31 installed on a welding device 30 is joined with the leading end of the pin 11e. Ultrasonic vibrations are applied to the jig 31 in this state. As a result, heat is generated by friction caused by the ultrasonic vibration and the leading end of the pin 11e is melted. Consequently, the leading end of the pin 11e is plastically deformed into the configuration as shown at the bottom of FIG. 3. In this manner, the locking head 11g is formed and welded to the outer surface of the second component 12.

As described above, the two pins formed on the female connector are inserted through the through-opening formed on each of the two separate components of the lever. Thereafter, the two components are joined with each other by an automatic ultrasonic welding device. Accordingly, it is unnecessary to expand one of the components of the lever in installing them on the female connector unlike the conventional method. The components can be installed on the female connector with no deformation or breakage occurring therein. Preferably, the ultrasonic welding device is operatively connected with devices for shaping resin into components of the lever and connector housings in order to save labor and efficiently accomplish the automatic manufacture thereof.

Figure 4:
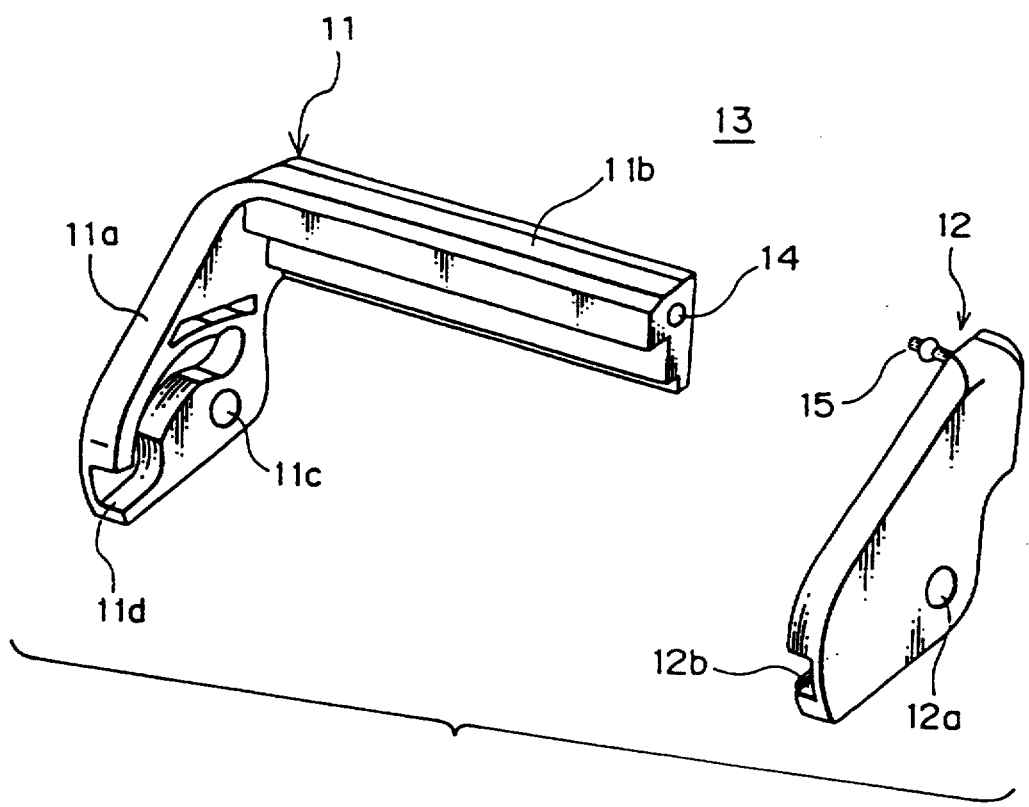
FIG. 4 is an exploded perspective view showing a lever according to a second embodiment of the present invention.
Figure 5:
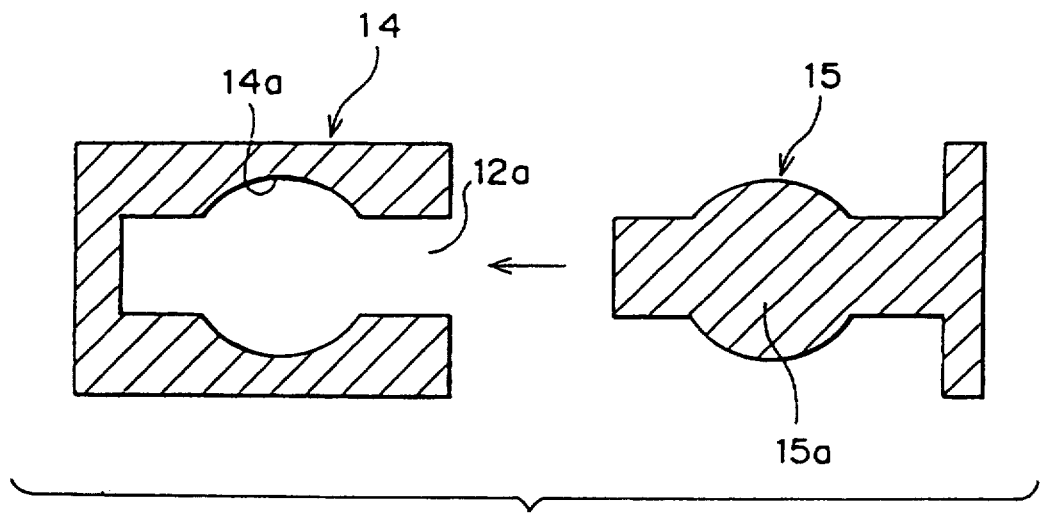
FIG. 5 is a sectional view showing the configuration of a metal plate of a lever according to a second embodiment of the present invention.

The second embodiment of the present invention is described below with reference to FIGS. 4 and 5. In the second embodiment, the first component 11 and the second component 12 are connected to each other by a connecting means different from that of the first embodiment. A metal plate 14, composing the first component 11 of a lever 13 is formed by insert molding. The metal plate 14 has a locking groove 14a formed in the vicinity of the leading end of the connecting portion 11b of the first component 11. A locking projection 15a is formed in the vicinity of the leading end of a metal plate 15 projecting from the second component 12. The locking projection 15a is inserted into the locking groove 14a to connect the first and second components 11 and 12 to each other. The lever thus formed has a U-shaped configuration.

Figure 6:
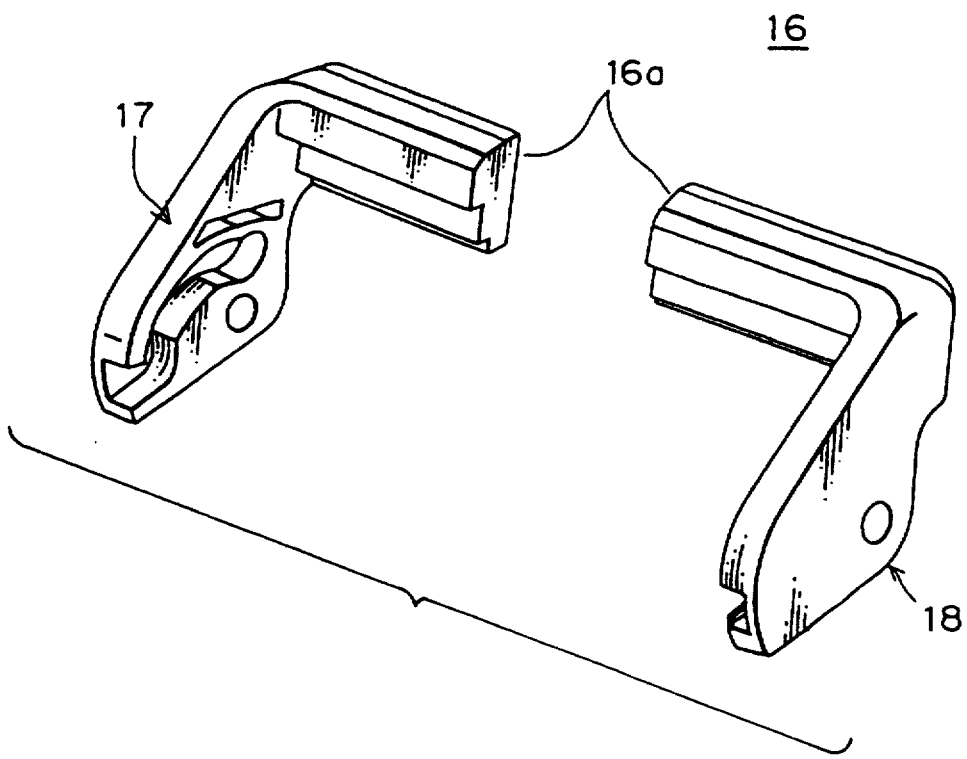
FIG. 6 is a perspective view showing a lever according to a third embodiment of the present invention.
Figure 7:
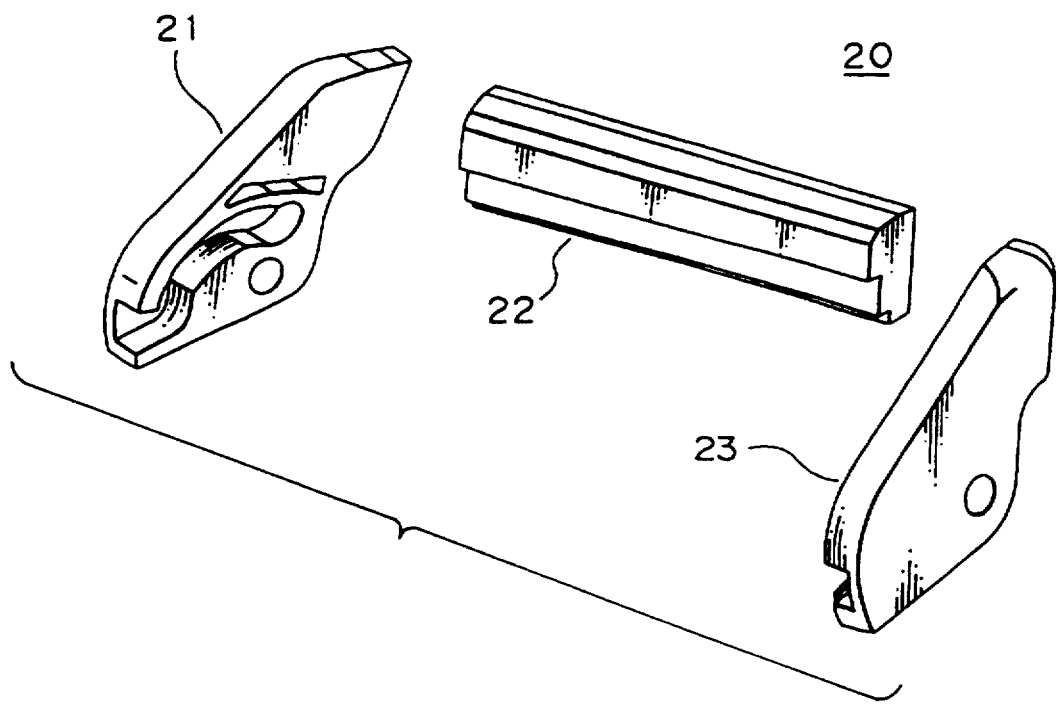
FIG. 7 is a perspective view showing a lever according to a fourth embodiment of the present invention.
Figure 8:
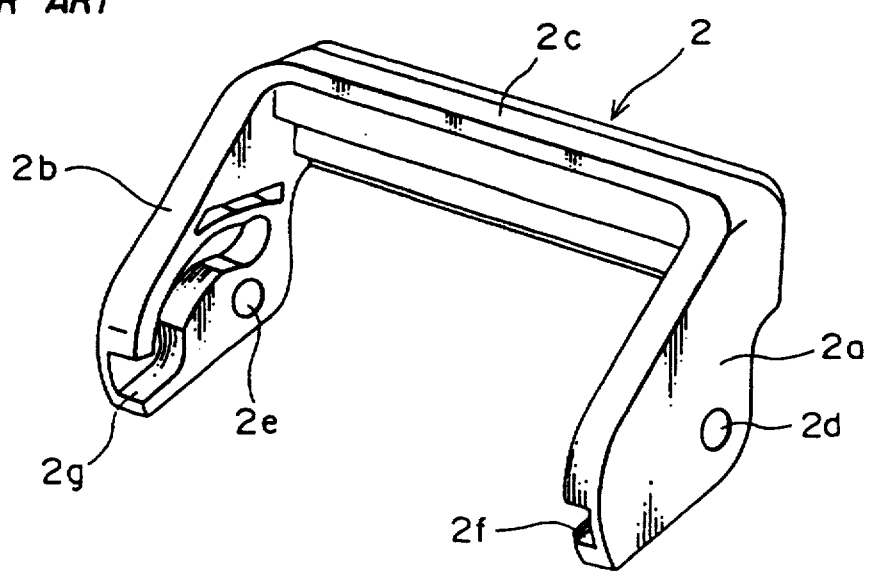
FIG. 8 is a perspective view showing a conventional lever.
Figure 9:
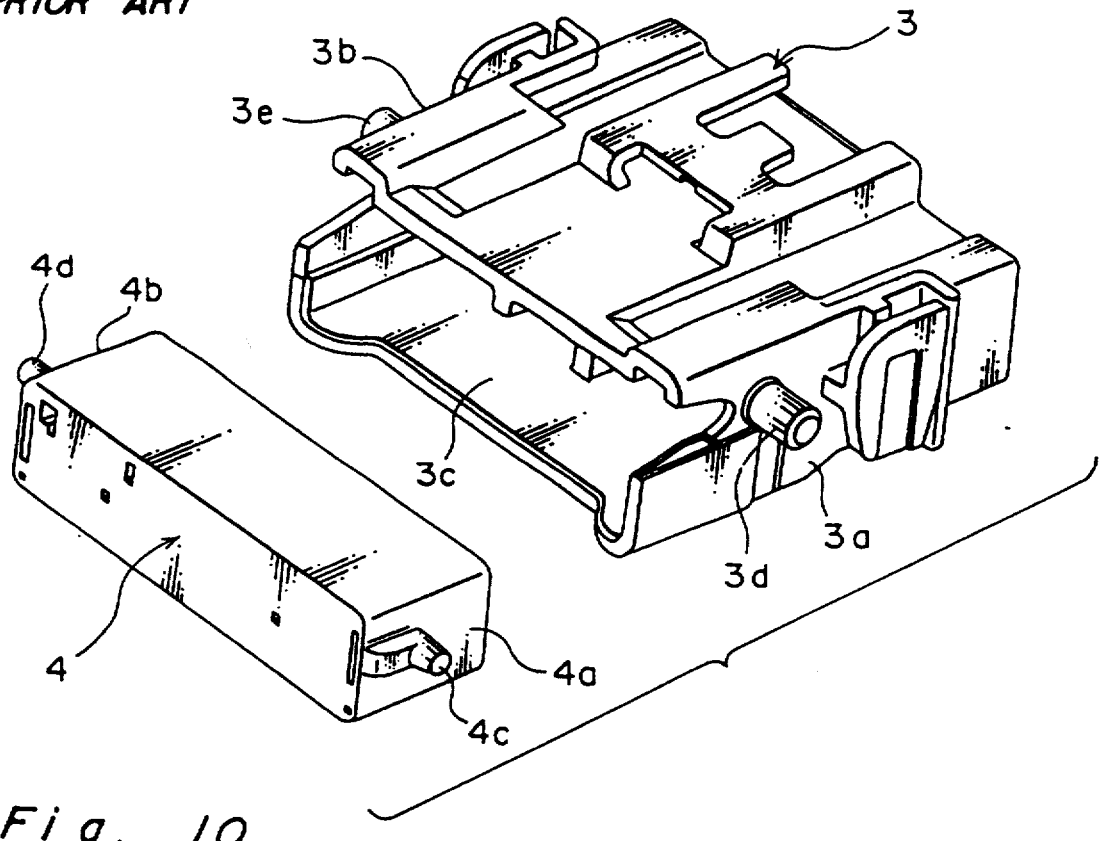
FIG. 9 is an exploded perspective view showing conventional male and female connectors.
Figure 10:
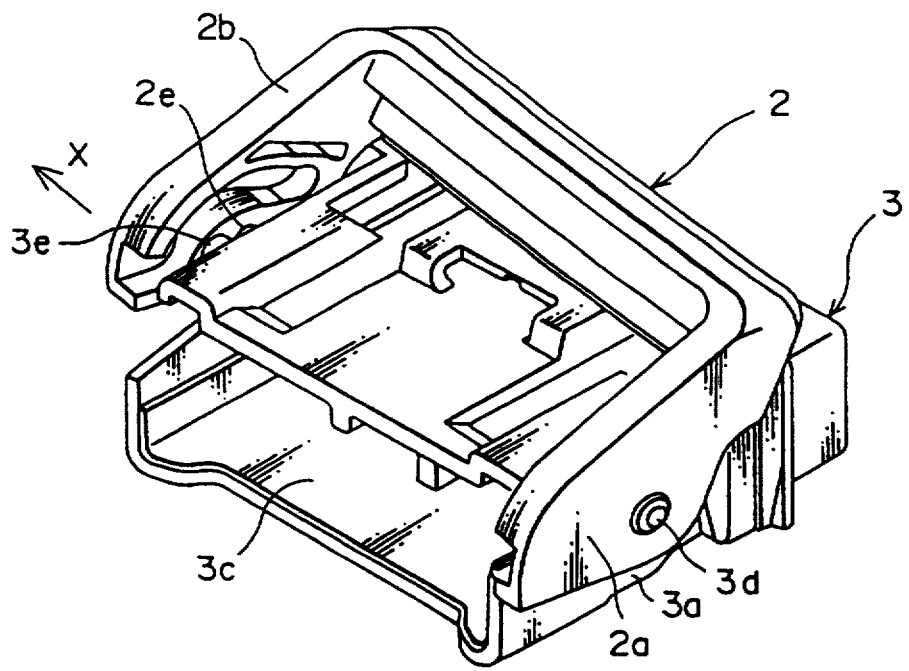
FIG. 10 is a perspective view showing the state in which the conventional lever is installed on the connector of FIG. 9.
Figure 11:
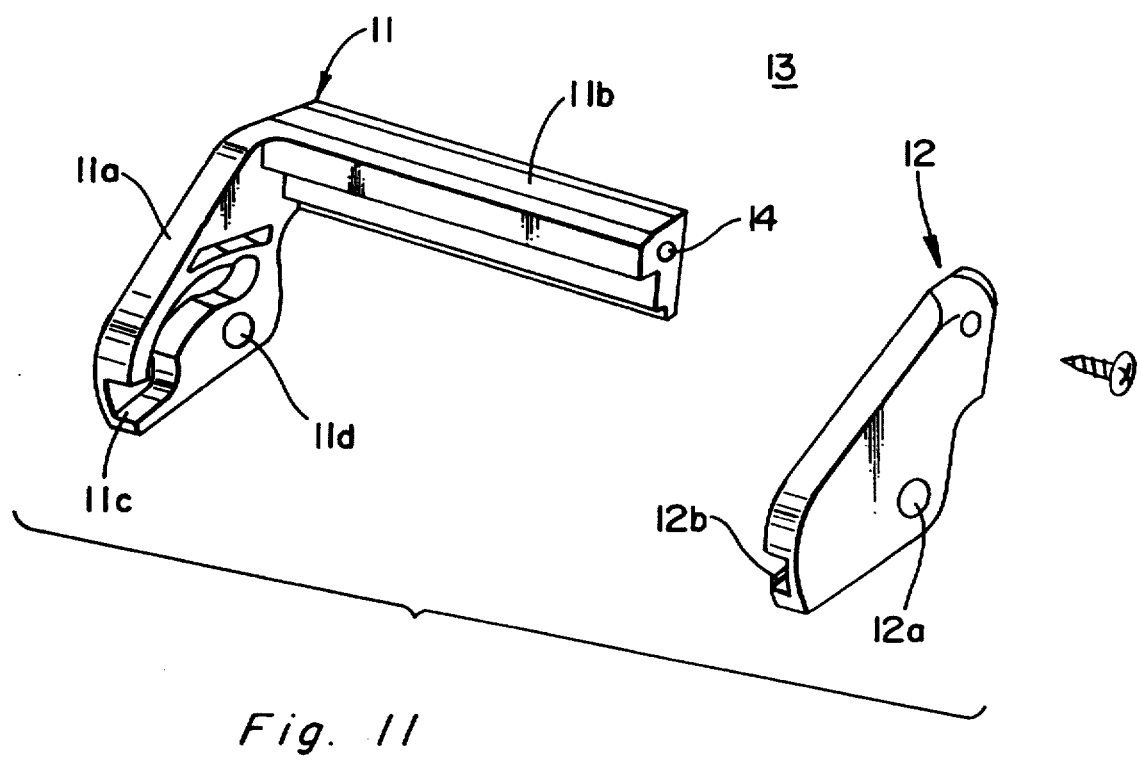
FIGS. 11-13 illustrate the lever components being connected by a screw.
Figure 12:
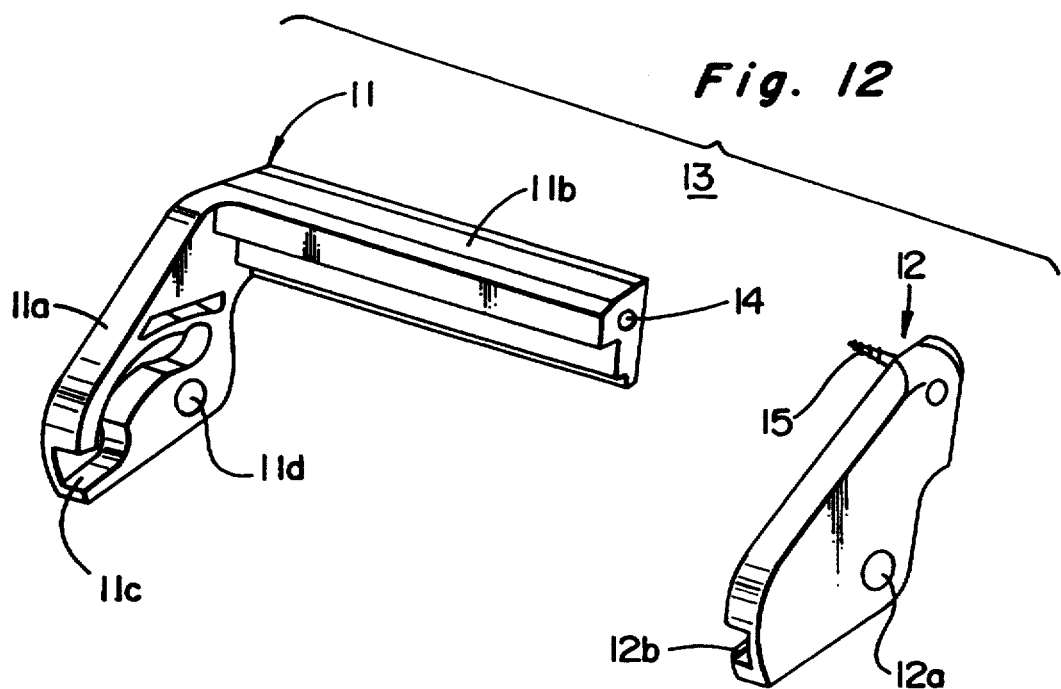
Figure 13:
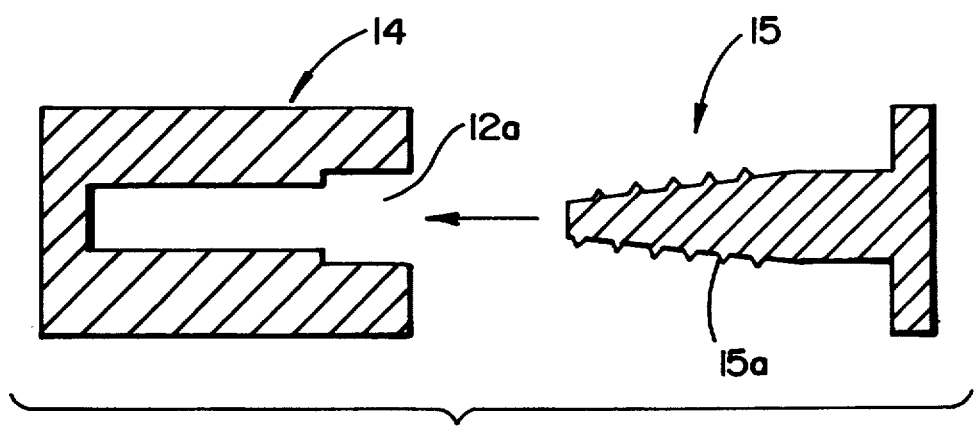

Levers according to the third and fourth embodiments of the present invention are described below with reference to FIGS. 6 and 7, respectively.

A lever 16 according to the third embodiment comprises a first component 17 and a second component 18 symmetrical with respect to the center of a connecting portion 16a.

A lever 20 according to the fourth embodiment comprises a first component (side wall) 21, a second component (connecting portion) 22, and a third component (side wall) 23.

The components of the lever according to the third and fourth embodiments are joined with each other by the joining means according to the first and second embodiments or appropriate automatic joining devices.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A lever type connector comprising a lever, said lever type connector including at least two separate and detachable components, a first connector and a second connector to be connected to each other, a pair of supporting pins each projecting from both side walls of the first connector and rotatably inserted through a through-opening formed on two of said at least two separate components of the lever, each said supporting pin being inserted through a respective through opening before said at least two separate components of the lever are connected to each other; and a pair of guide pins each projecting from the second connector and engaging with a guide groove formed on said two of the separate components of the lever, the lever being rotated to move the second connector into the first connector to connect the first and second connectors to each other or move the second connector away from the first connector to disconnect the first and second connectors from each other by means of the engagement between the guide pins projecting from the second connector and the guide grooves formed on the components of the lever.

2. The lever type connector as defined in claim 1, wherein said at least two separate and detachable components of the lever are joined with each other by a joining means to shape the lever into a U-shaped configuration, with each of the pins of the first connector inserted through the through-opening formed on said two of the components of the lever.

3. The lever type connector as defined in claim 2, wherein the U-shaped lever comprises a plurality of separate components, said plurality of separate components including first and second separate components, the first component includes a side wall and a connecting portion to form an L-shaped configuration, and the second component includes a side wall, the first and second components being connected to each other by means of a joining means formed at a joining surface of the first and second components.

4. The lever type connector as defined in claim 1, wherein the lever comprises two components symmetrical with respect to the center of a connecting portion, said two components including two side walls and the connecting portion, each side wall of the lever including a through-opening through which a respective supporting pin of the second connector is inserted.

5. The lever type connector as defined in claim 1, wherein the components of the lever are joined with each other, wherein a pin is projectingly formed in the joining surface of one of the components and a through-opening is formed in the joining surface of the other component so that the pin is inserted through the through-opening, and the leading end of the pin which has projected from the through-opening is exposed to ultrasonic waves to melt resin composing the pin and weld the melted resin to the outer surface of the other component.

6. The lever type connector as defined in claim 1, wherein the components of the lever are connected to each other, wherein a metal plate composing one of the components of the lever is formed by insert molding, the metal plate having a locking groove is formed in the joining surface of one of the components, and a metal plate having a locking projection is formed in the joining surface of the other component, the locking projection being inserted into the locking groove to connect both components to each other.

7. The lever as defined in claim 1, wherein a screw is tightened into a threaded opening formed in the joining surface of each component to connect both components to each other.

8. In a lever type connector comprising a first connector and a second connector to be connected to each other, a lever including at least two separate and detachable components, each of a pair of supporting pins projecting from both side walls of the first connector is rotatably inserted through a through-opening formed on two of the separate components of the lever; each of a pair of guide pins projecting from the second connector engages a guide groove formed on said two of the separate components of the lever; and the lever comprising the components joined with each other is rotated to move the second connector into the first connector to connect the first and second connectors to each other or move the second connector away from the first connector to disconnect the first and second connectors from each other by means of the engagement between the guide pins projecting from the second connector and the guide grooves formed on the components of the lever, the separate components of the lever being joined with each other by a joining means to shape the lever into a U-shaped configuration, each of the pins of the first connector being inserted through the through-opening formed on said two of the components of the lever before the separate components of the lever are joined with each other.

9. The lever type connector as defined in claim 1, wherein the lever comprises three components, said three components including two side walls and a connecting portion, said connecting portion connecting said two side walls, each side wall of the lever including a through-opening through which a respective supporting pin of the second connector is inserted.

* * * * *